United States Patent
Nielsen et al.

(10) Patent No.: US 6,167,904 B1
(45) Date of Patent: Jan. 2, 2001

(54) HYDRAULIC VALVE

(75) Inventors: Helge B. Nielsen, Sydals; Hans Christian Sand, Sønderborg, both of (DK)

(73) Assignee: Danfoss A/S, Nordborg (DK)

( * ) Notice: Under 35 U.S.C. 154(b), the term of this patent shall be extended for 0 days.

(21) Appl. No.: 09/185,362

(22) Filed: Nov. 3, 1998

(30) Foreign Application Priority Data

Nov. 3, 1997 (DE) .............................. 197 48 343

(51) Int. Cl.[7] ....................................... G05D 7/01
(52) U.S. Cl. ............................ 137/468; 137/501
(58) Field of Search ................... 137/501, 468

(56) References Cited

U.S. PATENT DOCUMENTS 4,074,693 * 2/1978 Kates ...................................... 137/501
4,161,961 * 7/1979 Knapp et al. .......................... 137/501

* cited by examiner

Primary Examiner—Stephen M. Hepperle
(74) Attorney, Agent, or Firm—Lee, Mann, Smith, McWilliams, Sweeney & Ohlson

(57) ABSTRACT

A hydraulic valve with a housing, having an inlet connection and an outlet connection with a hollow space between them, in which a valve slide is arranged to reciprocate, and, depending on its position, sets a flow cross section between the inlet connection and the outlet connection more or less free. In such a valve it is intended to improve the operational behaviour, that is, on the one hand to prevent a jamming and on the other hand to keep the leakage small. For this purpose, the valve slide is surrounded by a bush, which is arranged to be radially expandable in the hollow space.

15 Claims, 1 Drawing Sheet

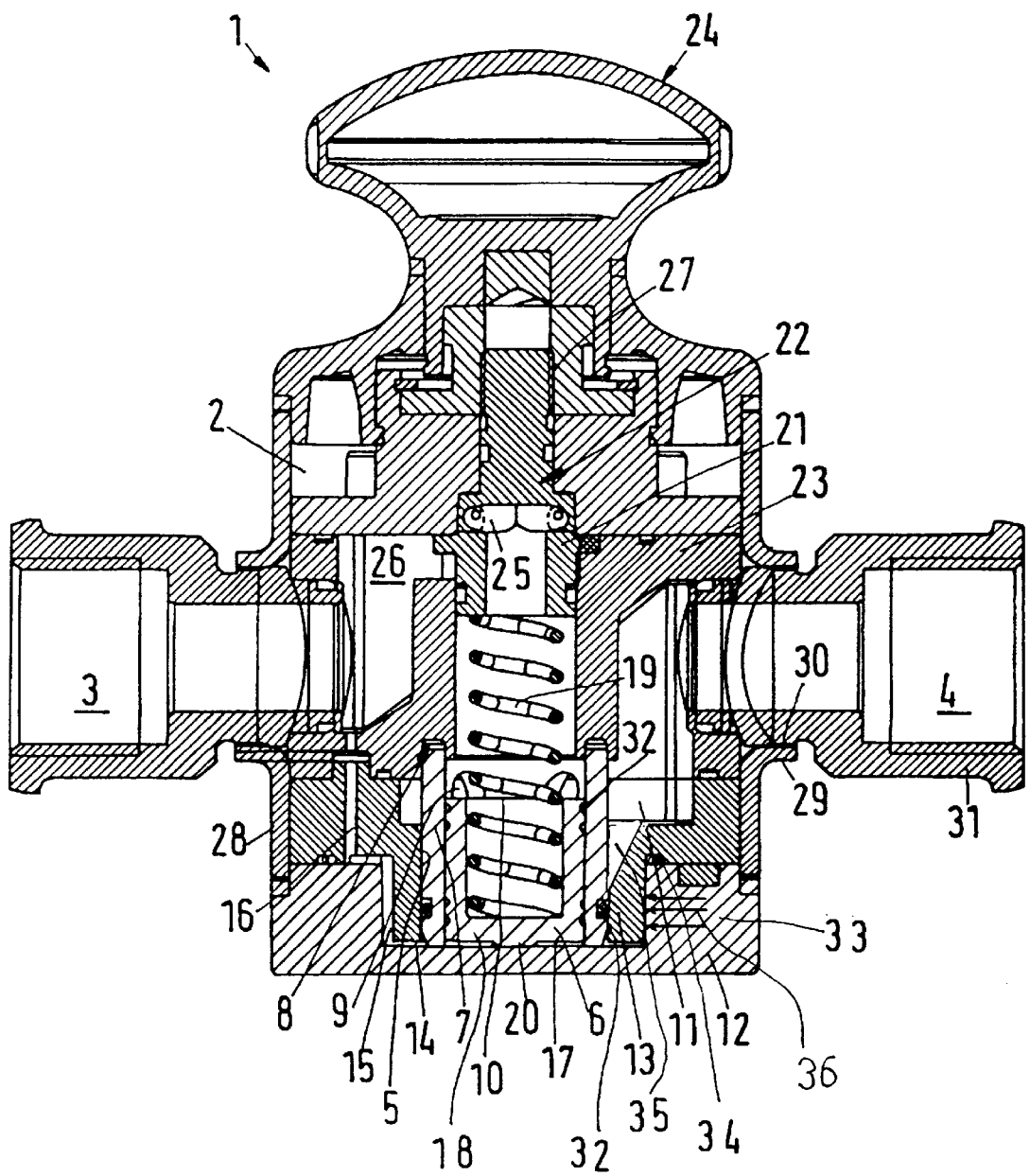

HYDRAULIC VALVE

BACKGROUND OF THE INVENTION

The invention concerns a hydraulic valve with a housing, having an inlet connection and an outlet connection with a hollow space between them, in which a valve slide is arranged to reciprocate, and, depending on its position, sets a flow cross section between the inlet connection and the outlet connection more or less free.

A hydraulic valve of this kind is known from DE 43 41 848 A1. A similar embodiment is found in DE 195 07 086 A1.

In such hydraulic valves the problem is to synchronise the valve slide correctly in relation to the surrounding wall in the hollow space. It would be ideal, if the valve slide could slide with practically no play in the housing, as then a very good sealing would be provided. However, such an embodiment can only be realised in theory. In practice, temperature and pressure fluctuations cause deformation of the valve slide, for example an increase in its diameter, which leads to a jamming. Then the valve slide cannot move any more. The valve loses its function. To avoid such a jamming, valves of this kind are dimensioned so that the valve slide is arranged in the housing with a relatively large play. A disadvantage in this connection is, however, that the valve is not "tight", that is, relatively large amounts of hydraulic fluid can flow from the inlet connection past the valve slide to the outlet connection. Further, a certain hysteresis cannot be avoided, which is caused by the fact that in some cases the valve slide will get stuck anyway because of an expansion. Particularly in valves having a high control frequency, that is, in which the valve slide reciprocates relatively fast, the friction of the valve slide produces a relatively high heat load, which again involves the risk of a thermally conditioned expansion, which again can lead to a jamming. The same problem also occurs, when a relatively high pressure rules in the valve slide, in the state of the art defined to be a hollow cylinder, which pressure presses the valve slide outwards towards the wall of the hollow space.

SUMMARY OF THE INVENTION

It is the task of the invention to improve the operational behaviour of the valve.

In a hydraulic valve as mentioned in the introduction, this task is solved in that the valve slide is surrounded by a bush, which is arranged to be radially expandable in the hollow space.

Thus, the valve slide no longer bears direct on the housing. On the contrary, a bush is arranged between the housing and the valve slide in a way that the bush can expand radially without being obstructed by the housing. In this connection it is considered that a temperature increase, which causes an enlargement of the valve slide diameter, will also cause a similar enlargement of the bush diameter. As, however, the bush can expand, these mutual enlargements can relatively reliably prevent a jamming. The same applies for an expansion caused by an increased pressure in the hollow space, which can in many cases also influence the inside of the valve slide. Also here the diameter increase of valve slide and bush can be synchronous, so that this constructively relatively simple measure can prevent a jamming of the valve slide in the housing. Accordingly, the play between valve slide and bush can be made relatively small. Tests have shown that, all other conditions being unchanged, the leakage rate can be reduced to 20%, and additionally, the hysteresis inclination could be seen to be reduced.

Preferably, the housing has, at least in the area surrounding the bush, a larger flexibility than the bush, for example, it is softer or more resilient in this area. When the bush expands, for instance caused by a temperature increase, this is possible, as the housing cannot provide a sufficient resistance against this expansion. The same applies for expansions caused by an increased pressure inside the bush. Also here the bush can expand without being obstructed by the housing.

Alternatively or additionally, the bush can be floatingly supported in the housing. The "floating" support means that in the circumferential direction the bush is supported by a fluid cushion. If required, this cushion can be interrupted by sealings surrounding the bush in the circumferential direction and being arranged in one or several positions in the axial direction. The fluid cushion, which is normally subjected to a certain pressure, provides on the one hand that the bush is supported radially from the outside. On the other hand, however, it also permits a certain radial expansion, as long as the expansion forces are larger than the forces caused by the pressure, which is regularly the case.

Preferably, the housing is made of plastic. Most plastics can be dimensioned so that they have the desired flexibility. Additionally, plastics have the advantage, that they are relatively simply produced by moulding, particularly injection moulding, so that also complicated channel arrangements can be realised in the housing without causing drastic increases in the production costs. Further, a plastic housing can be made so that with little production effort and a high accuracy it can admit the bush, in a way that a play in the radial direction between bush and housing can to a large extent be prevented. This improves the operational behaviour of the valve.

In this connection it is particularly preferred that the bush is made of a metal. It is assumed that a metal has a lower resiliency than the plastic. With equal forces the metal bush will thus expand less than the plastic housing. However, this condition is what is wanted. As, during an expansion the metal bush will absorb most of the forces acting in it, be it pressure forces or expansion forces caused by a temperature increase, the load on the plastic of the housing will be kept relatively low.

Preferably, at least a part of the length of the housing surrounding the bush is surrounded by a reinforcement ring, inlet pressure acting between the reinforcement ring and the housing. A reinforcement ring of this kind will always be expedient, when the housing is made of plastic, as often a plastic does not have the required mechanical stability. Thus, the housing is additionally supported mechanically by the reinforcement ring, at least on part of the length, in which also the bush is arranged. Further, the support can be additionally improved when inlet pressure is ruling in this area, that is, between the housing and the reinforcement ring. Then the hydraulic fluid, which is submitted to inlet pressure, also supports the housing radially from the outside. This makes the valve particularly suited for the use of water as hydraulic fluid.

In this connection it is particularly preferred for a sealing to be arranged between the bush and the housing, which sealing separates an inlet pressure area from an outlet pressure area, the hollow space in the outlet pressure area having an inside diameter, which is increased in relation to the outside diameter of the bush. When hydraulic fluid under inlet pressure, which is normally higher than the outlet pressure, is ruling radially from the outside, the housing is in danger of getting deformed radially inwards in this area, as on the inside only the outlet pressure is ruling. A deformation of this kind can be permitted, if initially an increased hollow space has been provided to prevent such a choking of the housing from exerting a radially inwards acting force on the bush. In this case the pressure exerted on the housing radially from the outside is insignificant. This embodiment has the additional advantage that the bush gets even more free, so that the limits on its deformability are steadily getting wider, meaning that the behaviour of the bush in connection with an expansion is in fact practically determined exclusively by the bush itself.

Preferably, the sealing between the bush and the housing lies closer to an end of the bush than a sealing between the housing and the reinforcement ring. Thus, the inlet pressure can still act upon the housing. This gives rise to some sort of lever formed between the two sealings. Due to the extended clearance the deformation caused this way is of no importance any longer. In this connection, the sealing between the bush and the housing lies closer to the end, which is next to the outside of the valve, that is, the end on which the valve slide bears when releasing the largest possible opening between the inlet connection and the outlet connection.

Preferably, the bush and the valve slide have substantially the same expansion behaviour. Thus, dimension changes of slide and bush have synchronous behaviours, so that over a relatively large area a narrow clearance can be maintained between the valve slide and the bush. The risk that the valve slide will get jammed in the bush is just as low as the risk that the leakage rate will suddenly rise heavily. Of course, such a condition is only possible within certain limits. However, these limits can be placed so that the operational range of the valve, for example the pressure range, is covered. In this case the bush and the valve slide can be made of different materials.

Preferably, however, it is provided that the materials of bush and valve slide have substantially the same coefficient of thermal expansion and/or the same resilience module. Thus, the main influencing dimensions, which can lead to a dimensional change of valve slide and bush, are reduced. The materials can be chosen with regard to the expected loads. If the valve is operated in areas, where a deformation is more likely because of a pressure load, the material will probably be chosen with regard to the same resilience module. If a jamming is likely to happen because of a temperature increase, it is more probable that the coefficient of heat expansion will be considered.

In a particularly preferred embodiment it is provided that the bush and the valve slide are made of the same material. Thus, the materials of both parts will automatically have the same resilience module and the same coefficient of heat expansion. The fact that both parts are made of the same material makes it relatively easy to achieve that both behave the same under the same conditions.

This is particularly the case when the bush and the valve slide are made as hollow cylinders. In this case both parts do not only have the same material properties, but also similar constructive embodiments, so that their behaviours on pressure and temperature changes will be even more alike.

Advantageously, the wall thicknesses of the two hollow cylinders have a relation in the range from 2:1 to 1:2. Thus, the valve slide has at least half and maximum double the wall thickness of the bush. Even with a relatively small play of, for example, 4 μm problems will practically not occur at pressures up to 50 bar. Higher pressures, however, will in many cases require a slightly larger slot.

Preferably, the bush is arranged in the housing with an axial play. This enables the bush to expand axially at a temperature increase. Thus, a temperature increase will not force the bush to expand towards the inside or the outside, which would lead to either a jamming or a large leakage. Also the mounting is simplified through this.

Advantageously, the bush has openings, which are swept over by a steering edge of the valve slide. Thus, it is ensured that the bush has wall areas, which can be exposed to pressure, so that a pressure acting on the inside of the bush can lead to a radial expansion. As the effective surface of the bush is larger than the corresponding surface of the valve slide, this does not lead to a jamming of the valve slide in the bush, but in the worst case to a slightly larger leakage.

BRIEF DESCRIPTION OF THE DRAWING

In the following the invention is described on the basis of a preferred embodiment in connection with the drawing, showing:

Only FIGURE a schematic section through a hydraulic valve.

DESCRIPTION OF THE PREFERRED EMBODIMENT

In the embodiment shown, a valve 1 is made as a flow control valve. It has a housing 2 with an inlet connection 3 and an outlet connection 4. Between the inlet connection 3 and the outlet connection 4 a hollow space 5 is provided in the housing 2, in which space a valve slide 6, made as a hollow cylinder, is arranged to be axially movable. The valve slide 6 is surrounded by a hollow cylindrical busing or bush 7, which is made of the same material as the valve slide 6, and is arranged to be substantially stationary in the housing 2. Only in the axial direction a small play 8 is provided between the housing 2 and the bush 7.

The bush 7 has control openings 9, which are swept over by a steering edge 10 of the valve slide 6. Depending on the axial position of the valve slide in the bush 7, the steering openings 9 are more or less covered by the valve slide 6.

Via an annulus 11 the control openings 9 are connected with the outlet connection 4.

On the side, on which also the valve slide 6 is arranged, the housing 2 is closed with a cover 12. Between the cover 12 and a housing part 13 surrounding the bush 7, there is a slot 14, which is connected with the inlet connection 3 via channels 15, 16. In the circumferential direction the slot 14 is to a large extent closed by the bush 7. When overlapping the slot, however, the bush 7 has a gap, so that hydraulic fluid from the inlet connection 3 can reach the closed front side 18 of the valve slide 6 to provide the valve slide 6 with the pressure of the inlet connection 3. This pressure presses the valve slide against the force of a spring 19 in a direction, in which the closing degree of the control openings 9 is increasing.

At least the housing part 13 surrounding the bush 7 is made of plastic. In the following it will be explained that further housing parts are also made of plastic. The plastic of the housing part 13 has a larger yielding than the bush 7, which, just like the valve slide 6, is made of a metal, preferably of the same metal as the valve slide 6. When the bush 7 expands, for example under the influence of an increased temperature, the housing part 13 will not provide a similar resistance, so that the expansion is not obstructed. In this connection, however, the plastic of the housing part 13 is resilient, so that a cooling and the corresponding reduction of the bush 7 will cause the housing part 13 to bear on the bush 7 again. The same applies for expansions caused by a higher internal pressure in the bush 7 or in the valve slide 6.

On its circumference, the cover 12 extends axially into a reinforcement ring 33, which surrounds the housing part 13.

A first sealing 32 is arranged between the housing part 13 and the bush 7, which sealing is closer to the end of the housing, which bears on the cover 12. A second sealing 34 is arranged between the reinforcement ring 33 and the housing part 13. Accordingly, as shown by means of arrows 36, the pressure of the inlet connection 3, the so-called inlet pressure, acts between the reinforcement ring 33 and the housing part 13. The inlet pressure 36 presses the housing part 13 radially inwards. As only the pressure from the outlet connection 4, the so-called outlet pressure, acts upon the side of the bush 7 lying above the sealing 32, a deformation of the housing part 13 here would possibly not be met by sufficient resistance, so that the inlet pressure 36 could cause a jamming of the housing part 13 on the bush 7 and thus a jamming of the valve slide 6 in the bush 7. To prevent this, the housing part 13 has in this area an increased diameter, that is, a diameter which is larger than the outer diameter of the bush 7. As this is a facultative embodiment, the increase 35 is only shown in the right half of the drawing. When this increase is provided, it naturally extends around the whole circumference of the bush 7. When it is not provided, the whole circumference of the bush is surrounded by the housing part 13, as shown in the left half of the drawing.

Additionally or alternatively to the flexibility of the housing part 13, it may in each case be provided that a fluid cushion is available, for example in the shape of a gap filled with a fluid. Such a fluid cushion, if available, is interrupted by the sealing 32, and ensures that actually the bush 7 has the required support to be floatingly arranged in the housing, though permitting a radial expansion of the bush 7.

The valve slide 6 is acted upon by the spring 19 in the opening direction for so long that a projection 20 on its front side 18 is brought to bear on the cover 12. The projection 20 is intended for ensuring that a space remains on the front side 18, into which the hydraulic pressure can expand.

The spring 19 bears on a slide 21, which is arranged to be axially movable in the housing 2. Just like the housing parts 23 surrounding it, the slide 21 can be made of the same plastic as the housing part 13. The slide 21 is acted upon by a piston 22, which again can be adjusted in the axial direction by means of a twist handle 24. In the position shown, the valve is closed. When, however, the piston 22 is moved axially downwards, the openings 25 in the piston 22 come to an overlap with a half-ring space 26, which is connected with the inlet connection 3.

The valve 1 works as follows:

A turning of the twist handle 24 will cause the piston 22 to be displaced by a predetermined unit. In this connection, the transmission takes place via, for example, a screw thread 27. This displacement adjusts on the one hand the pretension of the spring 19 and on the other hand the opening degree of the openings 25 in relation to the half-ring space 26. Hydraulic fluid can now flow from the inlet connection 3 via the half-ring space 26, the openings 25, the inside of the housing parts 23 and the steering openings 9 in the bush 7 to the annulus 11 and from there to the outlet connection 4. When the pressure in the inlet connection 3 increases, the valve slide 6 is displaced axially against the force of the spring 19 and closes the steering openings 9 somewhat more, so that a throttling effect occurs, which reduces the pressure in the outlet connection 4. The pressure in the outlet connection 4 can thus be kept constant, the adjustment of the pressure being made by means of the twist handle 24. This case will, for example, be desirable, when a constant pressure is ruling on the outlet connection 4.

The housing parts 13, 23 are made of plastic. To increase the compressive strength of the valve, the housing parts 13, 23 are surrounded by a metal enclosure 28, which encloses the housing 2 in the circumferential direction. In the areas, in which the inlet connection 3 and the outlet connection 4 are provided, the metal enclosure, which is simply made as a metal sheet enclosure, simply has bent-out walls 29 having on their inside a thread 30, in which connectors 31 are fitted. The wall 29 has a length, which is larger than the thickness of the sheet of the metal enclosure 28, so that the thread 30 can have a corresponding length and the connectors 31 can be screwed into the housing 2 with the required stability and thus also pressure stability. In this connection, the connectors 31 extend into the plastic of the part 23. Thus, the metal enclosure 28 is fixed on the housing 13, 23 in the axial direction and in the circumferential direction.

The connectors 31 can also be used for fixing a holder on the valve 1. This holder is then inserted between the connector 31 and the front side of the metal sheet wall 29, where the corresponding space is provided.

The housing parts 13, 23 are preferably made as injection moulded parts. The fact that the housing is subdivided into several parts makes it possible to provide relatively complicated channel structures without having to make great efforts when manufacturing the individual housing parts 13, 23.

The valve slide 6 can be made similar to the one known from DE 195 07 086 A1, that is, it can have grooves 32 on its circumference, so that between the valve slide 6 and the bush 7 a pressure cushion will occur, which prevents an immediate bearing of the valve slide 6 on the inside of the bush 7. When the valve 1 is used for water hydraulics, that is, with water as hydraulic fluid, the grooves 32 can also provide a fluid film between the valve slide and the bush, so that, even though there is no lubrication between the bush 7 and the valve slide 6, a fluid film will remain to facilitate the sliding.

What is claimed is:

1. Hydraulic valve comprising a housing having an inlet connection and an outlet connection with a hollow space between them, a valve slide located in the hollow space and being arranged to reciprocate, and, depending on its position, create a generally free flow cross section between the inlet connection and the outlet connection, the valve slide being surrounded by a busing located between the housing and the valve slide, the valve slide being in direct contact with the bushing, the bushing being, the valve slide being in direct contact with the bushing, formed to be radially expandable in the hollow space on high temperature and/or pressures.

2. Hydraulic valve according to claim 1, in which the housing has, at least in the area surrounding the bushing or bush, a portion having a larger yielding than the bush.

3. Hydraulic valve according to claim 1, in which the bushing or bush is floatingly supported in the housing.

4. Hydraulic valve according to claim 1, in which the housing is made of plastic.

5. Hydraulic valve according to claim 4, in which the bushing or bush is made of a metal.

6. Hydraulic valve according to claim 4, in which at least a part of the housing surrounding the bushing or bush is surrounded by a reinforcement ring, inlet pressure acting between the reinforcement ring and the housing.

7. Hydraulic valve according to claim 6, in which a sealing is arranged between the bush or bush and the housing, the sealing separating an inlet pressure area from an outlet pressure area, and the hollow space in the outlet pressure area having an inside diameter which is larger than the outside diameter of the bushing or bush.

8. Hydraulic valve according to claim 7, in which the sealing between the bushing or bush and the housing lies closer to an end of the bushing or bush than a second sealing between the housing and the reinforcement ring.

9. Hydraulic valve according to claim 1, in which the bushing or bush and the valve slide have substantially the same expansion behaviour.

10. Hydraulic valve according to claim 9, in which the materials of bushing or bush and valve slide have at least one of substantially the same coefficient of thermal expansion and the same resilience module.

11. Hydraulic valve according to claim 10, in which the bushing or bush and the valve slide are made of the same material.

12. Hydraulic valve according to claim 9, in which the bushing or bush and the valve slide are hollow cylinders.

13. Hydraulic valve according to claim 12, in which the hollow cylinders each have a wall thickness having a relation in the range from 2:1 to 1:2.

14. Hydraulic valve according to claim 1, in which the bushing or bush is arranged in the housing with an axial play.

15. Hydraulic valve according to claim 1, in which the bushing or bush has openings which are encompassed by a steering edge of the valve slide.

* * * * *